July 9, 1968 R. P. SOURGENS 3,392,371

DATA TRANSMISSION SYSTEM WITH AUTOMATIC ERROR CORRECTION

Filed Aug. 20, 1964 3 Sheets-Sheet 1

INVENTOR
ROGER P. SOURGENS
BY
Abraham A. Saffitz
ATTORNEY

INVENTOR
ROGER P. SOURGENS
BY
Abraham A. Saffitz
ATTORNEY

DATA TRANSMISSION SYSTEM WITH AUTOMATIC ERROR CORRECTION

Filed Aug. 20, 1964

3 Sheets-Sheet 3

INVENTOR
ROGER P. SOURGENS
BY
Abraham A. Saffitz
ATTORNEY

United States Patent Office 3,392,371

Patented July 9, 1968

3,392,371

DATA TRANSMISSION SYSTEM WITH AUTOMATIC ERROR CORRECTION

Roger P. Sourgens, Bourg-la-Reine, France, assignor to Societe d'Applications Generales d'Electricite et de Mecanique, Paris, France, a company of France Filed Aug. 20, 1964, Ser. No. 390,926
Claims priority, application France, Aug. 28, 1963, 945,848
5 Claims. (Cl. 340—146.1)

ABSTRACT OF THE DISCLOSURE

The present invention relates to a start-stop telegraphic transmission system permitting the transmission of data signals with automatic correction of errors based on automatic comparison between the signals transmitted by a transmitter station and the signals retransmitted by the receiver station wherein the transmitter station and the receiver station each comprise a multistage central memory and means for bringing into operation a number of memory stages equal to the whole number which just exceeds the ratio of the forward and return propagation time to the duration of a data signal and wherein said transmitter comprises means for transmitting a first extended stop signal having a duration adjusted to said whole number of data signal durations, means for transmitting an error signal formed by a second extended stop signal having a duration smaller than the minimum of the adjustable duration of said first extended stop signal and means for checking the durations of the retransmitted first and second extended stop signals.

Figure 1A:
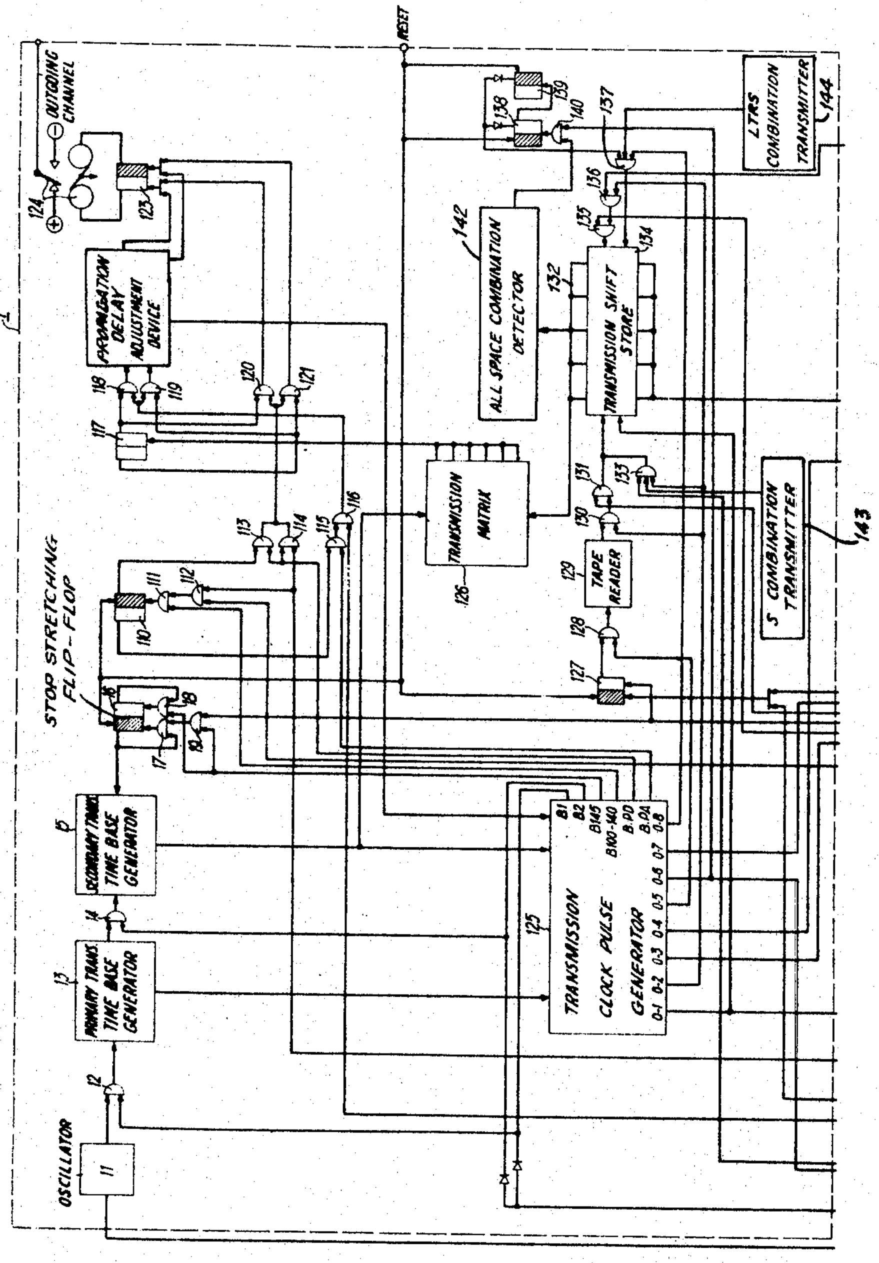

The present invention relates to a start-stop telegraphic communications system permitting the transmission of data with automatic correction of transmission errors based on automatic comparison between the signals transmitted by a transmitter station and the signals received by the corresponding receiver station and retransmitted by the latter to the transmitter station.

Numerous systems have been evolved on this principle. In particular one is known which is described in the copending U.S. patent application Ser. No. 323,697 entitled "Data Transmitting System" filed by the applicant on Nov. 14, 1963 and which has matured into Patent No. 3,336,576, issued Aug. 15, 1967.

In this system, as in the majority of systems which have been evolved in this field, the devices utilized have the object of detecting and subsequently correcting transmission errors which occur exclusively amongst the code elements of the telegraphic code or the data code.

However, other signals are used which may also be altered during the transmission.

These are:

(a) The extended stop element which terminates the transmission of the control signal for passing from the telegraphic transmission position to the data transmission position, which is the sequence SSSS in present procedure. It is known that in the abovementioned patent the essential object of this extended stop element is to inform the receiver station of the duration of the forward and return time with a view to enabling the receiver station to utilize an adequate number of memory stages, this number being equal to the integer which just exceeds the ratio of the sum of the forward and return propagation time of an elementary signal to the duration of a full start-stop signal. Assuming the stop element is a positive element, it is quite evident that any parasitic signal introducing a negative element during the transmission of this stop element prematurely marks the ends of the latter and in addition inserts a vertitable supplementary start-stop signal in the transmission.

(b) The extended stop element which signals an error. If a parasitic negative element is introduced in the same manner on the forward channel, it is in particular interpreted by the receiver station as the start element of the first combination retransmitted after detection of an error. The mechanism for the correction of errors by the receiver, based on the synchronous stage to stage transfer operation in the transmitter and receiver memories is in particular altered thereby;

(c) The start elements themselves. Assuming that the start elements are negative elements, if they are transformed into positive elements, they thereby become extensions of the preceding stop elements and are interpreted as such, either by the receiver and then by the transmitter if the inversion occurs on the forward channel, or by the transmitter alone if this inversion takes place on the return channel only;

(d) A normal stop element which may be abbreviated or incorrectly replaced by a negative element, which in particular entails defects of synchronism and which, independently of code errors, may in certain cases alter the synchronization of memory storage.

In addition, in the case where the apparatus is used in a switchable telegraph network (for example a telex system), it is necessary to avoid the transmission on the channel of more than two all spacing element combinations of the international code No. 2. As is known, these combinations are constituted by six consecutive negative elements and one and a half positive stop elements. The heavy predominance of the negative which results from a transmission of this type risks the accidental initiation of the disconnection operations in the switches through which the communication passes. After the ciphering of band of data for example, it may however happen that in the sequence of combinations which it is indispensable to transmit there will be a number of all spacing element combinations greater than 2.

The present invention has as its principal object the elimination of the disadvantages and shortcomings indicated above.

The various adjoining signals, which are independent of the code elements and are enumerated above, are protected by the following means and processes:

The extension of the stop element which terminates the transmission of the SSSS sequence for passing from the keyboard of a teleprinter to the automatic data transmission position, and the duration of which determines the number of memory stages utilized at the receiver station, is supplemented according to the present invention by a second emission of the sequence SSSS. One of the characteristics of the invention resides in the fact that the transmitter station is so organized that it actually commences the transmission of data only when it has recognized on the return channel the succession of signals as transmitted, namely the first sequence SSSS, then the extended stop signal, then the second sequence SSSS. It is quite evident that if there should be an alteration of the initial extension of the stop element, that is to say an alteration of the continuous positive signal framed by two SSSS sequencies, it would have the effect of causing said extension to be followed by a different signal from the repeated S which was transmitted by the transmitter station.

In the event of such an incident occurring, the transmitter station automatically stops its transmission, an alarm is operated to warn the operator, who has simply to press once again the operating button, the receiver station having at that time still recorded nothing.

Another characteristic of the invention is constituted by the fact that the extended stop element which constitutes an error signal is protected by a double precaution.

Its insertion length is first reduced to the strict minimum, that is to say to a unitary interval (20 milliseconds at 50 bauds), thus also reducing to a minimum the probability of its alteration. In addition, after having transmitted an extended stop element of this type, the transmitter station is automatically able to check the presence of this extension at the desired moment on the return channel. If this presence is not detected, the transmission of data is stopped immediately, an alarm is operated, and the communication passes back automatically to the normal telegraphic transmission position. The transmission of data is resumed only after the intervention of the operator of the transmitter station who then has available all the necessary information for correct resumption of the transmission of data.

Another characteristic of the invention is that the start element of the combination is likewise protected. In the event of a start element being transformed during the transmission into a positive element, the transmitter station, which through its organization detects on the return channel a stop element extension which it did not transmit, operates an alarm and likewise returns automatically to the telegraphic transmission position. As in the preceding case, the operator can once again resume the data transmission position after having previously transmitted all information to the receiver end.

Finally, another characteristic of the invention relates to the transmission of more than two consecutive all spacing element combinations of the international telegraphic code No. 2.

Transmission organization permits in the first place the detection of the transmission of such all spacing element combinations and in the second place the systematic introduction of an error in any all spacing element combinations transmitted which would be consecutively presented in the third position, while not altering it in the transmission memory storage. The correction of the errors has for a result that the sequence of all spacing element combinations is re-established at the receiver station without more than two all spacing element combinations being transmitted consecutively.

Figure 1B:
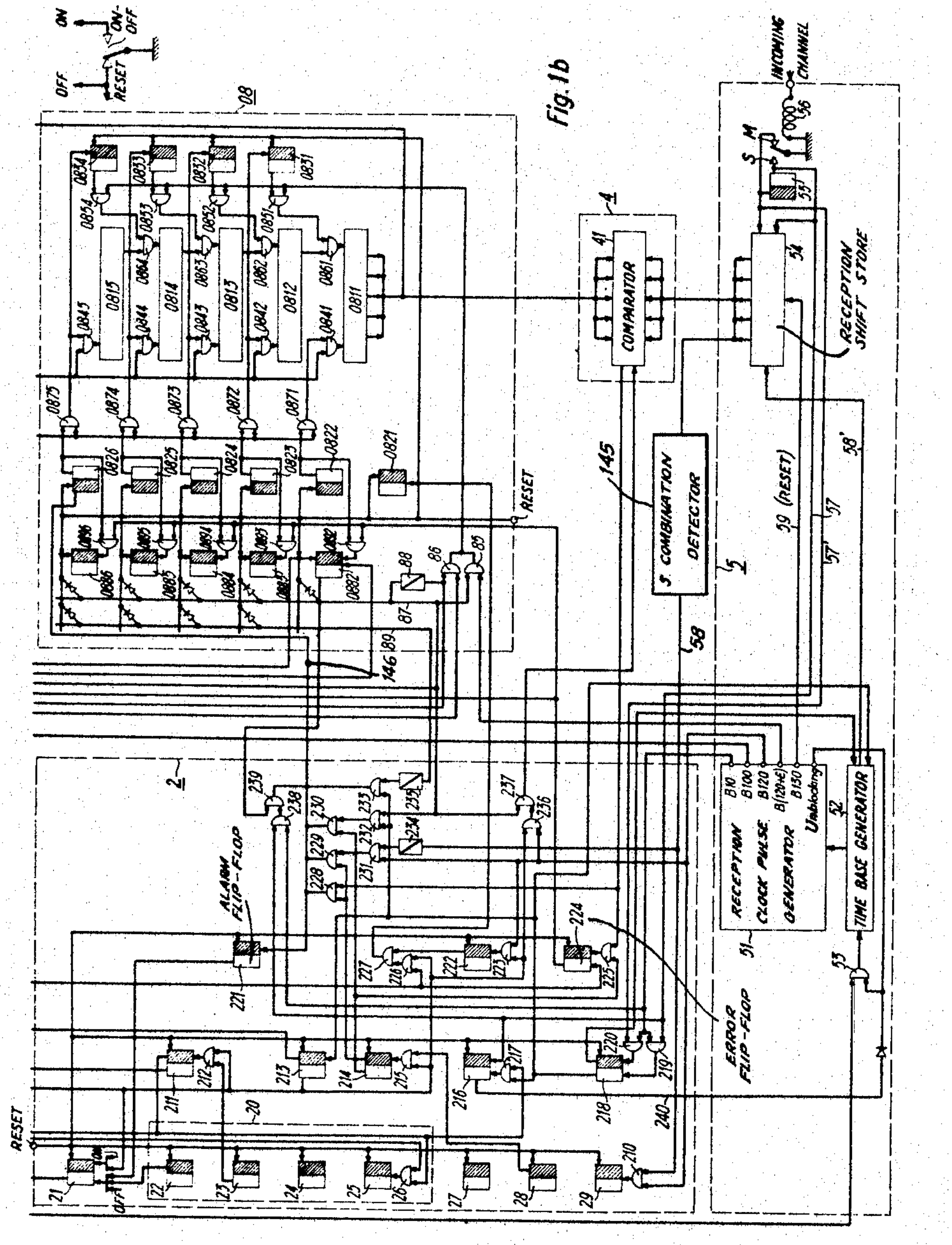
Figure 2:
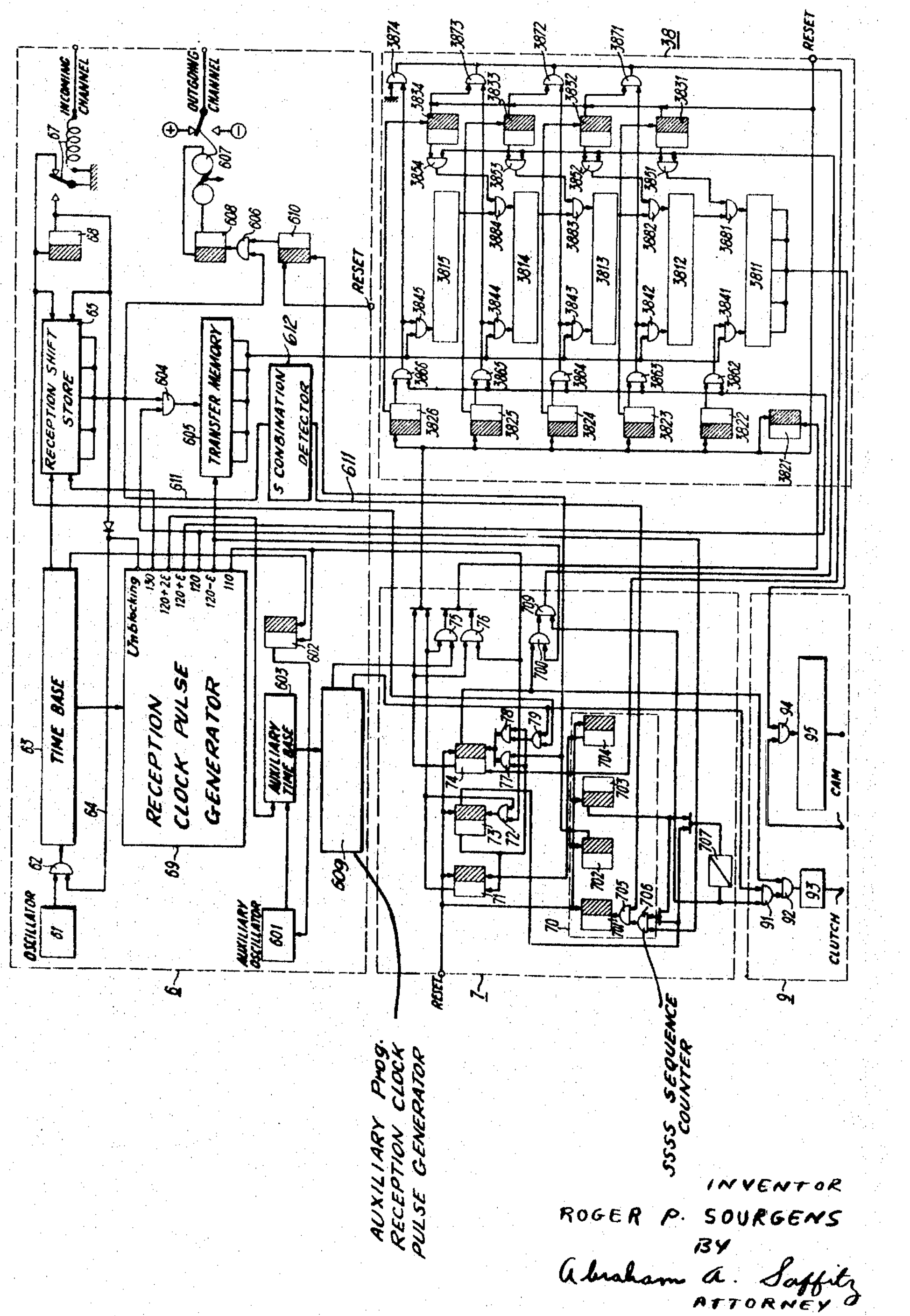

The invention will be better understood on reading the detailed description which will now be given and examining the accompanying drawings, in which:

FIGURES 1*a* and 1*b* illustrate the logical organization of a transmitter device according to the invention, and, FIG. 2 illustrates the logical organization of a corresponding receiver device.

For not intricating the drawing the internal connections of the counters comprised in the transmitter and receiver are not represented.

According to FIG. 1, the transmitter comprises five units numbered 1, 2, 4, 5, 08, which are:

(1) The transmitter proper 1, which contains:

A pulse generating oscillator 11;

A primary time base 13 fed by the oscillator 11 through a gate 12;

A secondary time base 15 fed by the primary time base 13, through a gate 14;

An error signalling unit constituted by a trigger circuit 16 and input gates 17, 18, and 19 whose function is to stretch the stop element;

An additive propagation adjustment control trigger circuit 110 with its input gates 111 and 112 and its two groups of output gates (133 and 114 on the one hand, 115 and 116 on the other hand);

A transmission trigger circuit 117 controlling two groups of two gates (118 and 119 on the one hand, 120 and 121 on the other hand);

A propagation delay adjustment device 122;

An output trigger circuit 123 controlling a telegraphic transmission relay 124;

A generator transmission clock pulse 125, this generator being controlled simultaneously by the primary time base 13 and the secondary time base 15, under the control of the adjustment propagation delay device 122;

A transmission matrix 126 supplying by six output terminals six gating pulses for transforming the parallel code elements from the transmission shift store into serial code elements;

A transmission shift store 134 fed with signals by a tape reader 129 through two gates 130 and 131 in series. This transmission shift store is likewise fed (where applicable), by change-over signals (sequences SSSS) through a gate 133. These sequences SSSS are produced by the transmitter 143. It likewise receives where applicable, for retransmission, through gates 135 and 136, the signals recorded in a central memory 08, which will be described further on. It also receives where applicable through a gate 137 a special combination the purpose of which will be seen hereinbelow. This special combination is produced by transmitter 144;

A trigger circuit 127 controlling the tape reader, with its output gate 128;

A device inhibiting repeated all spacing element combinations, comprising a counter constituted by two trigger circuits 138 and 139, an input gate 140 controlled by an all spacing element combination detector 142 and fed with pulses by the transmission clock-pulse generator 125 (output 0–6), and the output gate 137.

(2) *An automatic programmer unit* 2 the object of which is to control the various functions of the transmitter unit in accordance with the circumstances which may arise during operation and which it must previously recognize. This programmer unit comprises:

An on-off trigger circuit 21;

A counter 20 for SSSS sequences transmitted, comprising trigger circuits 22, 23, 24, and 25 capable of counting twelve consecutive S, this counter being fed through an input gate 26;

A counter for SSSS sequences received, constituted by trigger circuits 27, 28, and 29 and fed through an input gate 210;

A trigger circuit 211 controlling the transmission of SSSS sequences, fed through an input gate 212;

A trigger circuit 213 controlling the functions consecutive to the detection of any extension of the stop signal;

A trigger circuit 214 which controls the bringing into operation of the error detection and alram circuits as soon as there has been a passage to the actual data transmission position, this trigger circuit being fed through an input gate 215;

A trigger circuit 216 which controls the operation or the blocking of a reception clock pulse generator 51 associated with a reception time base 52 and the bringing of which into position one is controlled through a gate 217;

A trigger circuit 218 which stores the result of a test carried out at the moment ten milliseconds in each reception cycle. This trigger circuit is controlled through two input gates 219 and 220;

An alarm control trigger circuit 221, the bringing of which into position zero is controlled by gates 228, 229 and 231, 230 and 232, 233, and also by the zero output of the last trigger circuit 0826 of a counting-up counter which, as will be seen hereinbelow, is contained in the central memory;

A trigger circuit 222 the bringing of which into position zero through an input gate 223 eliminates the progression control of the counting-up counter contained in the central memory;

A trigger circuit 224 which through a gate 225 is brought into position zero whenever an error is found in the course of transmission, this trigger circuit controlling the subsequent operations;

A group of two gates 226 and 227, the opening of which is controlled respectively by trigger circuits 213 in position zero and 222 is position one, controlling the supply of transfer pulses to the counting-up counter contained in the central memory;

A group of two gates 236 and 237 the opening of which is controlled respectively by the trigger circuit 213 in the zero position and by a lead 87 connected to an auxiliary counter 0882–0886 the purpose of which will be seen hereinbelow.

(3) *A central memory* 08 the purpose of which is to record in a suitable order the combinations transmitted in order to be able to compare them with the signals returned by the corresponding receiver, and, in the event of an error being detected, to hold the recorded combinations ready for retransmission. This central memory has certain analogies with the memory serving the same purpose in the previously mentioned patent, and the same references designate therein the circuits serving the same purpose. This central memory comprises:

Five memory stages 0811 to 0815, with corresponding input gates 0841 to 0845 (there are as many gates giving access to each memory stage as there are binary elements to be recorded, for example five), controlled by the code elements included in the transmission shift store 134. Descending transfer gates 0861 to 0864 make it possible at the required moment, where necessary, to transfer the code elements from one memory stage to the immediately lower stage;

As associated counting-up counter comprising mainly six trigger circuits 0821 to 0826. These trigger circuits control respectively gates 0871 to 0875 which open access from the transmission shift store to the stages of the central memory 08;

An auxiliary counter constituted mainly by the trigger circuits 0882 to 0886 which are brought into position one respectively by the trigger circuits 0822 to 0826 when the latter come into position zero. These same trigger circuits 0882 to 0886 are brought into position zero through respective input gates 0892 to 0896 controlled by the respective trigger circuits 0822 to 0826 in position one. When at least one of the trigger circuits 0882 to 0886 is in position zero, the common output lead 87 is negative. The same is true of a lead 89 when any of the trigger circuits 0883 to 0886 is in the zero position;

A descending transfer control chain constituted mainly by trigger circuits 0831 to 0834 and respective output gates 0851 to 0854.

Two gates 85 and 86 which for the purpose of controlling the descending transfer of the contents of the memory stages apply to the gates 0851 to 0854 the clock pulses issued either at the moment 0–3 of the transmission clock pulse generator 125 (during retransmission), or at the moment ($120+\epsilon$) of the reception clock pulse generator 51, during normal operation.

(4) *A signal comparator* 41 the purpose of which is to compare, two by two, the combinations presented on the one hand by the first stage 0811 of the central memory 08 and on the other hand by a reception shift store 54 referred to hereinbelow.

(5) *A receiver unit* 5 permitting reception of the signals on the reception channel and their processing in conjunction with the organization explained above.

This receiver unit comprises:

The time base 52 fed through a gate 53 by the oscillator 11 which is common to transmission and reception;

The reception clock pulse generator 51 fed by the time base 52 and supplying clock pulses at predetermined moments in each reception cycle through five output terminals: B. 10, B. 100, B. 120, B. ($120+\epsilon$), B. 130 in the designation of which the figure following the letter B indicates the moment in milliseconds in the reception cycle. An input marked "unblocking" is connected to the trigger circuit 216 of the programmer;

A reception shift store 54 the input of which is controlled by a reception relay 56 associated with an anti-rebound trigger circuit 55. The transfer pulses from the reception shift store 54 to the comparator 41 are supplied by the time base 52 (wire 58').

OPERATION

The operation of the device forming the subject of the present invention is described below. The various functions are explained in the chronological order in which they arise in practice.

INITIAL POSITION

At the moment when voltage is applied, an on-off switch (shown in the margin in FIG. 1*b*) applies an earth potential to all the terminals of the general diagram which are marked RESET. In the transmitter 1, the trigger circuits 16, 127, 138 are thus placed into or held in the zero position while 110 and 139 are placed in position one. In the programmer 2, trigger circuits 21 to 25, 27 to 29, 211, 213, 214, 216, 218, 221, 222, and 224 are placed in position one. In the central memory 08, the trigger circuit 0821 is placed in position 1, as well as the trigger circuits 0882 to 0886 and 0831 to 0834, the trigger circuits 0822 to 0826 are placed in position zero.

1. *Starting-up preparatory phase*

By pressing the "on" button, the holding of the initial position described above is first terminated. The following operations then take place in succession. The trigger circuit 21 passes to poistion zero. This results in the opening of the gates 12 and 14 and the starting of the primary time base 13 and secondary time base 15; the transmission clock pulse 125 then operates:

(a) At the moment 0–1, which takes place a few microseconds after the starting of the start element, a signal on the corresponding output of 125 controls the return to zero of the stages of the transmission shift store 134, through the corresponding reset terminal of the latter;

(b) At the moment 0–2, a signal starts the marking of a combination S coming from the transmitter 143 in the transmission shift store 134 through the gate 133 opened by the trigger circuit 211, in the initial position one;

(c) At the moment 0–6 advance by one step of the counter 20, because of the pulse applied to said counter through the gate 26 which is held open by the trigger circuit 211 in the initial position one;

(d) Line transmission of the first combination S, because of the filling of the transmission shift store 134 previously effected and because of the operation of the transmission matrix 126.

The transmission trigger circuit 117 is in this way controlled by the matrix 126. Of the two groups of gates 118 and 119 on the one hand and 120 and 121 on the other hand, only the group 120–121 receives control pulses. The gate 116 held closed by the trigger circuit 213 in the initial position one does not transmit any pulse to the group of gates 118–119. On the other hand, the gates 113 and 114 are held open by the trigger circuit 110 in the initial position one and the pulses delivered by the generator 125 (terminal B–PD) feed the gates 120–121 through the gates 113 and 114. The output trigger circuit 123 is therefore operated direct by the trigger circuit 117, without the interposi.ion of the propagation delay adjustment circuit 122. The transmissions of the combination S thus follow one another without interruption up to the twelfth (three times four). On each of these transmissions of S, the binary counter 20 containing the trigger circuits 22–25 counts one more step, each of these steps corresponding to a different positioning of the group of trigger circuits 22–25 of which it is composed. On the twelfth step the trigger circuit 22, which had previously passed to position zero, returns to position one. On doing this, it applies a pulse to the trigger circuit 21 which assumes position 1. The gates 12 and 14 are then closed, the time base stops at the end of the last cycle, and an extended stop element is transmitted on the line.

Of the three sequences of four S which have thus been transmitted, the first served to control automatically the placing in the data receiving position of the installation of the corresponding receiver. The second and third only were consequently re-transmitted.

On reaching the transmitter station on the reception channel this second sequence of four S gives rise to the following operations:

The leading edge of the start element of the first S combination moves the trigger circuit 216 to the zero position through the wire 57, which has the effect of unblocking the reception clock pulse generator 51 and of opening the connection gate 53. As a result, the reception time base 52 comes into operation and through the wire 58' controls the progression of the reception shift store 54.

At the moment one hundred and twenty milliseconds of the reception cycle, the character stored in 54 is analysed. Through lead 58 the S combination detector 145 opens the gate 210 if the character stored in the reception shift store 54 is the character S. A pulse at the moment one hundred and twenty milliseconds of the reception cycle, issuing from the terminal B120 of the clock pulse generator 51, passes through 210 and is applied to the counter 27–29 which progresses one step.

At the moment one hundred and thirty milliseconds of the reception cycle, the pulse issuing from the terminal B130 of 51 returns the reception shift store 54 to the initial position, through the wire 59.

All the S combinations are recived in the same manner.

After the eighth S received, the time base 52 and the clock pulse generator 51 continue to operate, since gate 53 is maintained opened and generator 51 is maintained unblocked by the trigger circuit 216 through the wire 240. The reception relay 56 and the associated trigger circuit 55 are placed in the position corresponding to the extended stop element transmitted on the transmission channel after the twelfth S. The gate 220 is then opened by the wire 57'. At the moment ten milliseconds of the cycle started by the reception time base a pulse issuing from the terminal B10 passes through the gate 220 and places the trigger circuit 218 in the zero position, which gives rise to:

(a) The unblocked of the trigger circuit 213 to the zero position with the following consequences:

The setting of the trigger circuit 21 to the zero position and the starting of the transmission time base 13–15;

The opening of the gate 212 which is thus ready to transmit to the trigger circuit 211 the pulse issued by the transmission counter 20 at the end of the sequence which will follow;

The opening of the gate 215 for resetting the trigger circuit 214, which will have the effect of opening the gate 225 and possibly bringing into operation the error trigger circuit 224;

The opening of the gate 226 which together with 227 controls the progression of the counting-up counter of the central memory;

The opening of the gate 223 preparing the return to zero of the trigger circuit 222 for the later stopping of the counting-up counter by blockage of the gate 227;

The opening of the gate 236 which in cooperation with the gate 237 controls the switching on of the comparator 41.

(b) The transistion to state one of the trigger circuit 216 through the gate 217 opened by the trigger circuit 211 in the state one. In this state the trigger circuit 216 blocks the reception time base 52 and the reception clock pulse generator 51 which stop.

In these circumstances the transmission time base starts operating again for a new sequence of four S combinations immediately following the extended stop element which itself followed the transmission of the initial twelve combinations. This new sequence of four S combinations, unlike the previous ones, will be recognized on the return channel and checked for reasons of safety, as has been seen previously.

The operations relating to this transmission take place in the following order:

Moment 0–1 in transmission.—Return to zero of the transmission shift store 134; progression by one step of the counting-up counter 0821–0826 through the gates 226 and 227;

Moment 0–2 in transmission.—Marking in the transmission shift store 134 of the letter S through the gate 133 opened by the trigger circuit 211 in state one;

Moment 0–4 in transmission.—Marking of the combination S in the stage 0811 of the central memory 08, through the gates 0871 and 0841. The gate 0871 has been opened by the trigger circuit 0822 which came into position one on the first step of the counting-up counter, and the gates 0841 are opened or closed depending on the polarity of the corresponding element of the transmissin shift store 134;

Moment 0–6 in transmission.—Advance by one step through gate 26 of the S combination sequence counter 20. On the fourth S transmitted, the trigger circuit 23 passes to the zero state, which gives rise to the resetting of trigger circuit 211 through the gate 212 opened by the trigger circuit 213 in the zero state.

The following consequences result therefrom:

(a) Switching off of the S combination sequence transmitter 143 through the closing of the gate 133 on the one hand and the gate 26;

(b) The closing of the gate 217. This closed gate no longer permits the return to state one of the trigger circuit 216 after the latter has changed to position zero at the leading edge of the first start element received after the extended stop element, so that the reception time base 52 will be kept operating;

(c) The switching on the tape reading device 129 by controlling the trigger circuit 127 which on passing to state one opens the gate 128.

The leading edge of the first start element on the reception channel resets the trigger circuit 216 (by the wire 57), as has been previously seen, thus triggering the reception time base 52 and reception clock pulse generator 51.

At the moment ten milliseconds of the reception cycle, the trigger circuit 218 assumes state one, through the action of the pulse coming from terminal B10 of 51, through the gate 219.

At the moment one hundred and twenty milliseconds of the reception cycle, the pulse coming from the terminal B120 of 51 resets the trigger circuit 222 through the gate 223, which is opened by the trigger circuit 213. The gate 227 is thus closed, thus interrupting the progression of the counting-up counter 0821–0826.

At the same moment one hundred and twenty milliseconds of the reception cycle, the pulse coming from the terminal B120 of 51 passes through the gates 236 and 237, which have been placed in the passing position respectively by the trigger circuit 213 in position zero and the lead 87 of the central memory 08. This pulse reaches the comparator 41 and permits comparison of the combinations recorded in the memory 0811 and reception shift store 54.

At the moment one hundred and twenty millisecond$+\epsilon$ of the reception cycle, the pulse coming from 51 passes through the gate 85 and those of the gates 0851 to 0854 which have been opened by the associated trigger circuits 0831 to 0834 of the decending transfer control chain, these trigger circuits having been placed in the zero position up to the higher level reached by the counting-up counter.

At the moment one hundred and thirty milliseconds of the reception cycle, the reception shift store 54 is returned to zero through the wire 59.

The four reception cycles of this last sequence SSSS take place in the same manner. At each cycle a signal through lead 58 opens the gate 210 and a pulse coming from the terminal B120 of 51 causes the counter 27–29 to progress one step.

At the moment one hundred and twenty milliseconds of the fourth cycle, the trigger circuit 28 of the counter 27–29 comes into position one and applies a pulse to the gate 215 which is opened by the trigger circuit 213. The trigger circuit 214 then passes to state zero, thus opening the gate 225 and thus preparing the switching on of the error trigger circuit 224.

The tape reader having been put into operation, the transmission of data immediately follows the last sequence of four combinations S if no error occurred in the receiver conditioning sequences.

It will be seen below how the apparatus behaves when an error is found in the routing of these sequences.

Two cases have to be considered in the actual transmission of data.

1. *Operation without error*

(a) *Transmission.*—The transmission time base having been operated ten milliseconds after detection on the return channel of the extended stop element, the successive operations take place in the following manner:

Moment 0–1 in transmission.—Return to zero of the transmission shift store 134;

Moment 0–2 in transmission.—Marking in the transmission shift store 134 of the combination read by the reader 129, through the gates 130 and 131, the last-mentioned gate being opened by the common lead 87 of the central memory 08 which is brought to a positive potential;

Moment 0–4 in transmission.—Marking of the central memory stage selected by the counting-up counter of the combination displayed by the transmission shift store 134;

Moment 0–5 in transmission.—Advance by one step of the reading device 129 through the gate 128 opened by the trigger circuit 127 in state one. During one hundred and fifty milliseconds thereafter, the transmission on the line, in series, through the transmission devices already described (matrix 126, transmission trigger circuit 117, output trigger circuit 123 and output relay 124) of the data contained in parallel in the transmission shift store 134.

(b) *Reception.*—It will be observed that the reception time base operates permanently (rhythmically) and causes the reception shift store to progress according to the following programme:

Moment 10 in reception.—Confirmation in state one of the trigger circuit 218 as each start element is detected;

Moment 120 in reception.—A pulse is transmitted by the gate 236, opened by 213 in position zero, and the gate 237, opened by the lead 87 of the central memory 08, to the comparator 41 to permit comparison of the combinations recorded simultaneously in the memory stage 0811 and the reception shift store 54. If these combinations are identical, the pulse in question is blocked in the comparator 41. Otherwise, that is to say if the combinations recorded in 0811 and 54 are not the same, the pulse is not stopped by the comparator 41. It will be seen below what occurs in the latter case.

Moment (120+ϵ) in the pulse coming from the corresponding reception.—Terminal of the reception clock pulse generator 51 controls, through the gate 85 opened by the lead 87 and those of the gates 0851 to 0854 opened by the triggers of the counting up counter the descending transfer control chain of the data recorded in the store 08, in the course of which each memory stage receives information from the immediately higher stage;

Moment 130 in reception.—Return to zero of the reception shift store 54.

2. *Operation with an error detected*

(a) *Detection of the error.*—At the moment 120 in reception, the pulse applied at 41 through the gate 237 leaves the comparator again, passes through the gate 225 opened by the trigger circuit 214 causes the error trigger circuit 224 to pass to the zero position; this effects the following:

The disconnection of the tape reader 129. On coming to the zero position the error trigger circuit 224 controls in fact the reset of the trigger circuit 127, thus closing the gate 128;

The opening of the gate 19. At the moment 145 in transmission, the pulse coming from the terminal B145 will pass through the gates 19 and 17, the latter being opened by the trigger circuit 16 in position zero and will bring the last-mentioned trigger circuit to position one. In this state the polarity transmitted by this trigger circuit 16 to the time base corrects the cycle in hand and extends the stop element by twenty milliseconds. As explained formerly, this extension of the stop element constitutes the error signal. The trigger circuit 16 is returned to position zero, which will restore a normal duration to the following cycles, through a pulse which appears on the terminal B145 of the generator 125 at the moment one-hundred and fourty-five milliseconds of the next cycle and which passes through the gate 18 which is opened by the trigger 16 in state one;

The placing in state one of the trigger circuits 0882–0886 of the auxiliary counter of which the input gate 0892 to 0896 is opened by the one of the trigger circuits 0822 to 0826 of the counting-up counter which, in position one, indicates the upper level of the memory used. In the starting position, the auxiliary counter 0882–0886 therefore displays the same positions as the counting up counter 0822–0826.

The lead 87 is then negative because because one of the trigger circuits 0882–0886 is in the zero state. The gate 85 is closed, thus eliminating the descending transfer control by the pulse occurring at the moment (120+ϵ) in reception. On the other hand, the gate 86 is opened through the medium of the inverter circuit 88. The descending transfer is controlled by a pulse 0–3 of the transmission clock pulse generator 125.

The lead 87 also blocks the gate 131, thus preventing any marking of the transmission shift store 134 by the tape reader 129. On the other hand, the gate 135 is opened at the same time as the gate 86, thus permitting the marking of the transmission shift store 134 by the last stage 0811 of the central memory, with a view to its retransmission. At the moment (120+ϵ) in reception, no functions are carried out and at the moment 130 in reception the shift store 54 is returned to zero.

(b) *Retransmission.*—The first cycle which follows the transmission of the "error" signal (extension of the stop element by twenty milliseconds) takes place as follows:

Moment 0–1 in transmission.—Return to zero of the transmission shift store 134, return to state one of the trigger error circuit 224;

Moment 0–2 in transmission.—Marking in the transmission shift store 134 of the combination recorded on the stage 0811 of the central memory, through the gates 135 and 136;

Moment 0–3 in transmission.—Control of the descending transfer in the central memory 08 through gate 86;

Moment 0–4 in transmission.—Marking on the top level used of said central shift store 08 of the combination recorded in the transmission memory 134;

Moment 0–7 in transmission.—Control of the auxiliary counter 0882–0886, the function of which is to deduct one step at each retransmission cycle; transmission on the line of the combination contained in 134 (that is to say the combination found to be erroneous).

The end of the retransmission and the return to normal transmission are controlled by the auxiliary counter 0882–0886. Since, as has been seen, its starting position corresponds to the top level of the central memory 08 used, and as each transmission cycle deducts one step, this counter has returned to the original position when the contents of the central memory 08 have been entirely retransmitted. To be more precise, at the moment 0–7 in the transmission of the last combination retransmitted, the trigger circuit 0882 of the auxiliary counter returns to position one. As it does this, it transmits a pulse to the trigger circuit 127 and places the latter in position one, thus switching on the tape reader.

In addition, the lead 87 has become positive again, which effects the following:

Closure of the gate 86 and opening of the gate 85. The control of the descending transfer is again effected by the pulses produced in the terminal $(120+\epsilon)$ of the reception clock pulse generator 51;

The opening of the gate 237 which switches on the comparator 41;

The opening of the gate 131 and the closure of the gate 135, which effects the return to normal transmission through the tape reader and eliminates the retransmission of the combinations stored.

ASSOCIATED FUNCTIONS

The associated functions are described below.

1. *Propagation delay adjustment*

The forward and return propagation delay is adjusted by inserting or not a delay line termed propagation delay adjustment device 122 connected between the transmission trigger 117 and the transmission relay control trigger 123. This insertion is decided automatically during the first transmission of SSSS combinations, while the extension of the stop element which follows immediately has not yet been transmitted. When this is required to be done, this operation is brought into effect by the trigger circuit 110 which:

In position one opens the gate 113. The pulses leaving the terminal PD of the transmission clock pulse generator 125, which then pass through said gate 113, are applied to the group of gates 120–121 and control the output trigger circuit 123 by one input or the other depending on the rhythm of telegraphic modulation imposed by the transmission trigger circuit 117;

In position zero opens the gate 115. The pulses leaving the terminal PA of the transmission clock pulse generator 125 pass through the gate 115 and also the gate 116 controlled by the trigger circuit 213, as has been previously seen, and are then applied to the group of gates 118–119 controlled by the transmission trigger circuit 117. These pulses are then applied, in accordance with the telegraphic modulation rhythm imposed by the trigger circuit 117 on the propagation delay adjustment device 122 which introduces a systematic delay enabling the abovementioned critical propagation conditions to be avoided. These critical conditions are automatically detected in the following manner.

It has been seen that as soon as the transmitter starts to operate and until the first extended stop element is detected, the trigger circuit 213 is in state one. This trigger circuit then opens the gates 112 and 114.

The gate 112, which at each moment 100 in the reception cycle receives a pulse from the terminal B100 of the reception clock pulse generator 51, is placed in series with a gate 111 which in turn is controlled by a positive gating pulse of 100 to 140 milliseconds of each transmission cycle supplied by the transmission clock pulse generator 125. Where there is coincidence, that is to say where the reception pulse 100 places the trigger circuit 110 in the zero position, it can be returned to the state one only by manual resetting. In this position the gate 115 is opened and the gate 113 closed, thus preparing the bringing into operation of the propagation delay adjustment. This is not in fact done immediately. As long as the trigger circuit 213 remains in position one, that is to say as long as the first extended stop element at the end of the first three series of SSSS has not been detected, the gate 114 remains open. The pulses leaving the terminal PD of the transmission clock pulse generator 125 are applied through the gate 114 to the group of gates 120–121 which control the direct transmission from the trigger circuit 117 to the trigger circuit 123 by-passing the propagation delay adjustment device.

In addition, the pulses leaving the terminal PA of the transmission clock pulse generator 125 cannot yet pass through the group of gates in series 115 and 116, the latter being inhibited by the trigger circuit 213 in position one.

To sum up, throughout the transmission of the three preparatory sequences of four S, the propagation delay adjustment device 122 is not yet operated (this not being necessary because there is still no comparison of signals at 41). The propagation delay adjustment is brought into operation only after the first extended stop element which gives the measure of the forward and return propagation time.

PROHIBITION OF TRANSMISSION OF MORE THAN TWO CONSECUTIVE ALL SPACING ELEMENT COMBINATIONS

In order to avoid the risk of disconnection in automatic exchanges through which the transmission link passes in the case of an excessive predominance of negative elements incorporated in the telegraphic modulation, the use of devices preventing the transmission of more than two consecutive all spacing element combinations has been recommended. The system used here, when a larger succession of such all spacing element combinations must be transmitted, systematically introduces an error after two consecutive all spacing element combinations; this error consists in the transmission of the "letter (LTRS)" combination composed of five positive code elements. This error is obviously detected and corrected so that on reception, on the data output tape, the all spacing element combinations are found in full, while during transmission on the line a LTRS combination is periodically interposed after two all spacing element combinations.

The device utilized for this purpose is the following:

A lead 132 originating at an all spacing element combination detector 142 opens the gate 140 each time such a combination is stored in the transmission shift store 134;

At the moment 0–6 in transmission, for a first transmission of an all spacing element combination, the trigger circuit 138 assumes state one and changes trigger 139 to position zero;

At the moment 0–6 in the transmission of the following cycle, if there is once again an all spacing element combination in the shift store 134, the trigger circuit 138 assumes the zero state;

At the moment 0–6 in the transmission of the following cycle, if there is again an all spacing element combination in the transmission shift store 134, the trigger circuit 138 assume state one and the trigger circuit 139 also assumes state one; the gate 137 is then opened and the pulse leaving the terminal 08 of the transmission clock pulse generator 125 transfers to the transmission shift store 134 LTRS.

Combination generated by a LTRS combination transmitter 143 and which is substituted for the third all spacing element combination. This LTRS combination will be transmitted on the outgoing line.

It will be observed that *previously* the transfer of the third all spacing element combination to the central memory 08 took place at the moment 0–2. It is therefore an all spacing element combination which in the last stage of the central memory will be compared with this LTRS combination transmitted on the line because of the combination substitution made at the moment 0–8 as has been described above.

ALARM CIRCUIT

An alarm circuit has been provided in case it has not been possible to detect the passage into the data reception position by the correspondent, or else in case an error signal or a start element has been altered in the course of transmission, or else when both have been altered simultaneously.

A trigger circuit 221 then comes into position zero and brings the trigger circuit 21 to the one state, the latter stopping the time base. An alarm (not shown) informs the operator that he must intervene in order to resume traffic. It should be pointed out that a prolonged stoppage in transmission (a stop of about one and a half seconds has been selected, although this value is not necessarily strict) automatically returns the communication to the telegraphic position.

The various cases of operation of the alarm device will now be examined.

(a) *The starting SSSS combinations are erroneous.*—At the start, eight S combinations are in principle returned by the corresponding station. If one of them is incorrectly received, the lead 58 from the S combination detector 145 is negative. The inverter circuit 234 reverses the polarity and the gate 231 is opened. At the moment 120 the impulse leaving the terminal 120 of 51 passes through the gate 231 and also the gate 229 opened by the trigger circuit 214 in position one. The trigger circuit 221 comes into the zero position and operates the alarm.

(b) *The extended stop element which follows is erroneous.*—The extended stop element which follows the transmission of twelve consecutive S combinations (of which only the last eight will be retransmitted) and serves in particular to let the remote receiver know the measure of the propagation time, may itself be in error. In this case it will be cut by at least one negative pulse so that on the return channel a character different from the SSSS sequence which is expected will be received.

It has been seen that at the start this last SSSS sequence is introduced into the central memory 08 for the purpose of comparison with the first combination which will be recorded after the extended stop element in the reception shift store 54.

In this case the pulse transmitted by 41 which detects the error passes through the gate 228 opened by the trigger circuit 214 in position one and operates the alarm by placing the trigger circuit 221 in the zero position.

(c) *A starting element is erroneous in normal traffic.*—In this case it is incorrectly replaced by a positive signal, that is to say by an "error" signal. The trigger circuit 218 then passes to the zero state. As the installation is not in the error position, the lead 87 is positive and the gate 232 is open. In these circumstances the transition of the trigger circuit 218 to the zero position produces a pulse which passes through the gate 232 and also the gate 230. This last-mentioned gate is in fact opened by the trigger circuit 214, which is now in the zero position (since the installation is in the data transmission position).

(d) *A start element is erroneous in the course of retransmission after an error.*—A start element of this type, incorrectly replaced by a positive element, appears during the retransmission of the characters contained in the central memory, that is to say before the auxiliary counter has returned to the original position. At least one of the trigger circuits 0883 and 0886 is then in the zero position, which has the result that the lead 89 is negative. Because of the inverter circuit 235, the gate 233 is then open. If at the moment of a test at ten milliseconds the trigger circuit 218 on detecting a positive element comes into the zero position, the pulse produced by it passes through the gate 233 and operates the trigger circuit 221.

(e) *The error signal is itself erroneous.*—It is known that this signal is constituted by a positive element of twenty milliseconds extending the stop element of the combination in course of transmission at the moment when the error is detected. This signal being altered, it becomes negative. The gate 238 is then opened by the receiver contact S. The gate 239 in turn is opened by the trigger circuit 0882 which, in the last position of the auxiliary counter, is in the zero state. At the moment ten milliseconds in the reception cycle, the pulse leaving the reception clock pulse generator 51 passes through two gates 238 and 239 and operates the alarm trigger circuit 221.

(f) *Excessive propagation time.*—In this case the capacity of the central memory is too low. The counting-up counter then first operates as far as the top level. The fiifth progression pulse places the trigger circuit 0826 in position one, so that the gates 0845 are opened and access is provided to the upper stage 0815 of the central memory.

If no reception has yet occurred on the reception channel, the gate 227 is still held open by the trigger circuit 222. A sixth transfer pulse is applied to the counting-up counter. This has the effect of changing the trigger 0826 to the zero position. The resulting pulse is applied direct to the alarm trigger circuit 221 via lead 146.

RECEIVER UNIT (FIG. 2)

The receiver comprises four associated devices:

(1) A reception device 6 comprising in particular:

An oscillator 61;

A reception time base 63 controlled by the oscillator 61 through a gate 62 which in turn is controlled by an unblocking lead 64;

A reception shift store 65;

An input telegraphic relay 67 associated with a trigger circuit 68;

A reception clock pulse generator 69 controlled by the time base 63 and supplying timing pulses;

An auxiliary oscillator 601 controlled by a trigger circuit 602;

An auxiliary time base 603;

An auxiliary reception clock pulse generator 609 associated with the auxiliary time base 603 and intended to supply clock pulses during the stoppage of the main time base;

A transfer memory 605 the input of which is controlled by a gate 604;

A relay 607 for retransmission on the transmission channel, controlled by a trigger circuit 608, the input gate 606 of which is in turn controlled by a trigger circuit 610;

(2) A program device or programmer 7 effecting the ordered control of the various functions of the receiver unit. This programmer comprises mainly:

A trigger 71 which controls:

the reset of a counting-up counter 3821 to 3826 which will be described hereinbelow;

a gate 75 which controls the feeding of said counting-up counter with progression pulses from the auxiliary reception clock pulse generator 609;

a gate 72;

A trigger circuit 73 which is reset to the original state one on switching the receiver on. Its transition to the zero position is controlled by a pulse at the moment 110 milliseconds in the reception cycle, this pulse coming from reception clock pulse generator 69 through the above-mentioned gate 72. In the zero position the trigger circuit 73 changes the trigger circuit 71 to position one and unblocks gates 77 and 78. In position one, it controls the gate 706 and the gate 91 through the inverter circuit 707;

A trigger circuit 74 which is reset to the original state one on switching the receiver on. In this position this trigger circuit controls the opening of the gate 700 [control of the counting-up transfer of the central memory by pulses originating at the moment (120−ε) from reception clock pulse generator 69]. It also controls the gate 92 which controls the clutch amplifier of the output punching machine. The transition of this trigger circuit 74 in the zero position is effected by means of a counter 70 for sequences of four S combinations, or more precisely by means of a trigger circuit 702 through a gate 77 or else through gates 79 and 78 by means of a test lead of the auxiliary reception clock pulse generator 609;

A counter 70 of S combination sequences, constituted mainly by four trigger circuits 701–704.

(3) A central memory 38 composed mainly of five memory stages 3811–3815. Each of these memory stages is fed through groups of gates 3841–3845 controlled by the transfer memory 605 and fed with pulses through other gates 3862–3866. These gates are controlled by trigger circuits 3822–3826 of a counting-up counter which is identical with the transmission counting-up counter, and receive their pulses through the output of the reception clock pulse generator 69 corresponding to the moment (120+ε).

The combinations contained in each of the memory stages 3811–3815 may be transferred to the immediately lower stage by means of gates 3881–3884, with the aid of a general downward transfer control circuit comprising triggers 3831–3834 (similar to triggers 0831 to 0834 of FIG. 1*b*) and gates 3851–3854 (similar to gates 0851 to 0854 of FIG. 1*b*). A general transfer pulse is transmitted through the group of gates in series 700, 709 by the output (120−ε) of the reception clock pulse generator 69. The trigger circuits 3831–3834 are brought in succession into the zero position (corresponding to the opening of the gates 3851–3854) by the trigger circuits of the counting-up counter 3823–3826 when they come successively into position one for a cycle.

The pulses at the moment (120+ε) of which mention has been made above are likewise applied by gates 3863–3866 to other gates 3871–3874. The last of these gates 3874 is constantly open. The other three 3871–3873 are respectively opened by triggers 3832, 3833, and 3834 in position one.

(4) A punching control unit 9 comprising:

A punching machine marking device 95, the input of which is controlled by a gate 94;

The clutch amplifier 93 the input of which is under the dual control of the two gates 91 and 92 in series.

OPERATION

We shall examine in succession:

The reception of sequences of S combinations for passage into the data reception position and the triggering of the subsequent operations;

The operation in the data reception position without an error being detected;

Operation in the data reception position with a detected error.

1. *Bringing into the data reception condition*

Three phases have to be considered:

(a) The recever receives the first SSSS sequence. It must detect the same and place itself in a condition in which it can retransmit on the return channel to the transmitter station the signals received from the latter;

(b) The receiver then receives the extended stop element. The receiver must automatically bring into operation the number of memory stages corresponding to the duration of propagation which this extended element represents;

(c) The last sequence of SSSS which immediately follows this extended element is a prelude to the actual transmission of data.

These three phases are organized in the following manner:

(a) *Reception of SSSS sequences.*—The first start element appearing on the reception channel (input relay 67 and trigger circuit 68) maintains the unblocking lead 64 positive at least during its own duration. The gate 62 is then opened and the pulses of the oscillator 61 are applied to the main reception time base 63. The latter feeds on the one hand the reception clock pulse generator 69 and applies progression pulses to the reception shift store 65.

The pulses produced by the reception clock pulse generator 69 effect the following:

At the moment (120−ε) milliseconds of this first cycle, the return to zero of the transfer memory 605;

At the moment 120 ms. (very slightly later), the transfer through the gate 604 (multiple five-element gate) to the transfer memory 605 of the combination displayed in the reception shift store 65.

At the same moment 120 ms., a pulse is applied to the S combination counter 70. This pulse is applied through the gate 706, opened by the trigger circuit 73 in state one and the trigger circuit 703 in state zero, and to the gate 705 opened by the S detection lead 611 which is rendered positive by the S combination detector 612 when the stages of the reception shift store 65 are filled in in accordance with the combination S;

At the moment (120+2ε) ms., the return to zero of the auxiliary time base 603;

At the moment 130 ms., the return to zero of the reception shift store 65;

At the moment 140 ms., the control by the reception time base 63 of the trigger circuit 602 which, on assuming the zero state, triggers the oscillator 601 and consequently the auxiliary time base 603. This auxiliary time base is not always utilized, particularly at the commencement of this phase of bringing the receiver into the data transmission position, but being required to operate fortuitously later on, for example for the purpose of detecting an unforeseeable error signal, it appeared necessary to operate it at every moment 140 ms. of the main time base 63 and to stop it at the following moments 110 ms. of the same main time base. Its purpose will be seen more clearly from the remainder of the description.

The three following S combination reception cycles are identical. By the fourth cycle the S combination counter 70 has advanced four steps. The trigger circuit 702 assumes state one and drives 610 to state one. The gate 606 is open. Starting from this moment, the modulation coming from the reception shift store 65 reaches, through said gate 606, the output trigger circuit 608 which operates the relay 607. This modulation is thereupon returned to the transmitter station. The following SSSS sequences are first returned.

At the moment 120 ms. of the last S cycle (the twelfth) which precedes the transmission of the extended stop element, the S combination counter 70 has advanced twelve steps. The trigger circuit 704 passes to the zero state and controls the transition of the trigger circuit 71 into the zero state. This last trigger circuit then effects:

The return to zero of the counting-up counter 3821–3826;

The opening of the gate 75 allowing the progression pulses coming from the auxiliary reception clock pulse generator 609 to be applied to said counting-up counter 3821–3826;

The opening of the gate 72 which prepares the transition of the trigger circuit 73 to the zero position by a pulse at 110 ms. coming from the reception clock pulse generator 69. (It will be noted incidentally that as the extended stop element immediately follows the cycle of the twelfth S, this transition of 73 to the zero position will be effected only in the first cycle which follows the extended stop element).

At the moment (120+2ε) of the last cycle S, the auxiliary time base 603 is returned to zero.

At the moment 130 ms., the transformer memory 605 is returned to zero.

At the moment 140 ms., the trigger circuit 602 is placed in the zero position by the main time base 63, thus triggering the auxiliary reception time base 603. In this case, the auxiliary time base will permit the interpretation of the duration of the extended stop element which follows so as to bring into operation a suitable number of memory stages.

(b) *Reception and interpretation of the extended stop element.*—The auxiliary time base 603 which has just been brought into operation feeds the auxiliary reception clock pulse generator 609. The latter supplies two types of pulses, progression pulses and test pulses.

The progression pulses are applied to the counting-up counter 3821–3826 through the gate 75. The first takes place 20 ms. after the commencement of the extended stop element. The following pulses succeed one another at intervals of 150 ms. Each advances by one step the counting-up counter, the trigger in state one of which, at first localized at 3821, is in succession transmitted to 3822 at the moment 20 ms. of the extended stop element, and then to 3823 at the moment (20+150) ms. then to 3824 at the moment (20+150+150) ms., and so on. When one trigger circuit of the rising counter 3821–3826 assumes the state one, the preceding trigger circuit automatically returns to the zero state.

In proportion as this state one progresses in the counting-up counter 3821–3826 during the duration of the extended stop element, the gates 3862–3866 are in succession opened by the trigger circuits 3822–3826 when the latter come into position one. In addition, the trigger circuits 3831–3834 of the downward transfer control circuit 3831–3834 are in succession brought into the zero position in the above order by the corresponding trigger circuits of the counting-up counter 3821–3826. They remain in that position until subsequently returned to zero. In this zero position, they open the corresponding gates 3851–3854 which, when controlled, will permit the control of the descending transfer in the memory 38.

(c) *Reception of the sequence SSSS following the extended stop element.*—The main time base 61–63 is triggered by the first start element following the extended stop element:

At the moment 110 ms. the trigger circiut 602 assumes the state one, thus blocking the oscillator 601, whereby the auxiliary time base 603 is stopped. In addition, the trigger circuit 73 assumes the zero state, which has the effect on the one hand of driving 71 to position one, thus closing the gate 75 and the gate 72, and on the other hand of opening the gates 77 and 78;

At the moment (120−ε), the transfer memory 605 is returned to zero;

At the moment 120 ms., the transfer memory 605 records through the gates 604 the combination displayed in the reception shift store 65 and the S combination counter progresses by an impulse applied to the gate 706;

At the moment (120+2ε), the auxiliary time base 603 is returned to zero;

At the moment 130 ms., the reception shift store 65 is returned to zero;

At the moment 140 ms., the trigger circuit 602 passes into the zero position and triggers the auxiliary time base 601–603.

2. *Operation of reception in the data transmission position without detection of an error*

The start element of the first combination which follows the above-mentioned SSSS sequence triggers the main time base 61–63;

At the moment 110 ms., the trigger circuit 602 passes from the zero state to the state one, thus freeing the oscillator 601, and the counting-up counter 3821–3826 progresses by one step, being controlled through the gate 76 opened by the trigger circuit 74 in the zero state;

At the moment (120−ε), the transfer memory 605 is returned to zero;

At the moment 120 ms. the combination stored in the reception shift store 65 is transferred through the gates 604 to the transfer memory 605;

At the moment (120+ε), the combination stored in the transfer memory 605 is transferred to the central memory on stage 3811, through the gates 3841 opened by the trigger circuit 3822 in position one and through the open gate 3862;

At the moment (120+2ε), the auxiliary time base 603 is returned to zero;

At the moment 130 ms., the reception shift store 65 is returned to zero;

At the moment 140 ms., the trigger circuit 602 passes into the zero position, whereby the auxiliary time base 603 is triggered.

The reception cycles follow one another and are organized in the same manner, with the exception that the counting-up counter advances by one step for each cycle, successively opening the gate 3862, then the gate 3863, then the gate 3864, and so on. At each moment (120+ε), the pulse which transfers to one of the stages 3812–3815 the combination stored in the transfer memory 605 is likewise applied to one of the gates 3871, 3872, 3873, or 3874 opened by the trigger circuits 3831 to 3834 (the last gate 3874 is permanently open).

Now, it has been seen that at the moment of the extended stop element which followed the transmission of the starting SSSS the twelve first S combinations, only the trigger circuits of the downward transfer control circuit which where put into operation by the counting-up counter had passed to the zero state, thus closing the corresponding gates 3871–3873. When at the beginning of the transmission of data the gates 3863 to 3866 are opened in succession and allow the pulses applied at (120+ε) ms. to pass, these pulses are stopped by the closed gates 3871–3873. When one of these pulses reaches the stage corresponding to propagation, it finds the first gate 3871–3873 open, passes through it, places the trigger circuit 74 in position one, thereby closing the gate 76 and consequently henceforth prohibiting the progression of the counting-up counter through the pulse at the moment 110 ms. of each cycle of the main time base. The position one of the trigger circuit 74 opens at the same time the gate 700 [control of the descending transfer by the pulses produced at the moments (120−ε) of the reception cycle], and also the gate 92 which controls the connection of the punching machine.

At the moment 10 ms. of the following cycle, the test pulse coming from the auxiliary reception clock pulse generator 609 controls the connection of the punching machine. 20 ms. later, the cam of the punching machine provides a pulse which permits the positioning of the electromagnets of the punching machine in accordance with the combinations stored in stage 3811 of the central memory 38.

At the moment (120−ε), the pulse coming from the reception clock pulse generator 69, at the same time as it effects the return to zero of the transfer memory 605, controls the descending transfer of the combinations stored in the central memory, as has previously been indicated.

3. *Operation with an error detected*

The auxiliary time base 603 being triggered at the moment 140 ms. of each cycle, at the moment 10 ms. of the following cycle its test lead applies a pulse to the gate 79. This gate is controlled by the reception relay 67 and the trigger circuit 68 associated with the latter. It is opened when a positive element is on the line. At this moment (moment 10 ms. in reception), this can normally be only an extension by 20 ms. of the stop element, this extension signalling an error.

The gate 78 associated with the gate 79 being itself opened, the pulse in question drives the trigger circuit 74 to the zero position, which effects the following:

The return to zero of the counting-up counter 3821–3826;

The opening of the gate 76 for a new progression of the counting-up counter;

The closure of the gate 700 preventing the descending transfer;

The closure of the gate 92 preventing the connection command of the punching machine, which is thus switched off.

As soon as a new combination appears on the reception channel, this will be the combination found to be erroneous by the transmitter station and retransmitted by the latter for rectification, followed by the contents of its central memory.

As at the commencement of operation for normal data transmission this rectified combination is recorded in stage 3811 of the central memory. The second combination is recorded in 3812, replacing the combination which was contained therein. The third is recorded in 3813, etc. until the top level determined by the extended stop element between the SSSS groups is reached. Transmission then resumes exactly as indicated above.

What I claim is:

1. A transmission system including a transmitter station having a first transmitter and a first receiver and a receiver station having a second receiver and a second transmitter, said transmission system being capable of operating in a telegraphic signal transmission position in which telegraphic signals are transmitted by the first transmitter to the second receiver and in a data signal transmission position in which current start-stop data signals are transmitted by the first transmitter to the second receiver and retransmitted by the second transmitter to the first receiver comprising:

(i) in the transmitting station, means for selectively transmitting function signals including a first predetermined sequence of data signals for switching the receiver station from the telegraphic signal transmission position to the data signal transmission position, a first extended stop signal of adjustable duration, a second predetermined sequence of data signals and second error representative extended stop signals, means for checking said current start-stop data signals and said function signals retransmitted by the receiver station with the corresponding transmitted current start-stop data signals and function signals, an alarm device, means for controlling said second error representative stop signals transmitting means, in response to said checking means when the same is checking the current start-stop data signals and means for operating said alarm device in response to said checking means when the same is checking the function signals;

(ii) in the transmitter and receiver stations multistage stores for storing therein a number of consecutive current date signals preceding the actually transmitted data signal, means for deriving from the duration of the first extended stop signal the number of stages of said multistage stores to be brought into operation and means for retransmitting the stored data signals in response to the second error representative extended stop signal.

2. A transmission system according to claim 1 in which the duration of the second error representative extended stop signals is smaller than the minimum of the adjustable duration of the first extended stop signal.

3. A transmission system according to claim 1 in which the extension of duration of the second error representative extended stop signal is equal to one element of the code of the current start-stop data signals.

4. A transmission system according to claim 1 in which the means for deriving from the duration of the first extended stop signal the number of stages of the multistage stores in the transmitter station and receiver station comprises:

(i) in the transmitter station, means responsive to the end of the first predetermined sequence of transmitted data signals for initiating the first extended stop signal, means responsive to the beginning of the first predetermined sequence of retransmitted data signals for cutting-off said first extended stop signal and means for applying, during said first extended stop signal, recurrent clock pulses having a period equal to the duration of a current start-stop data signal to the transmission station multistage store for successively operating the stages thereof;

(ii) in the receiver station, means for sensing the beginning and the end of said first extended stop signal and means for applying, during said first extended stop signal, recurrent clock pulses having a period equal to the duration of a current start-stop signal to the receiver station multistage store for successively operating the stages thereof.

5. A transmission system including a transmitter station and a receiver station connected through a switching network, said transmitter station having a first transmitter and a first receiver and said receiver station having a second receiver and a second transmitter, said transmission system being capable of operating in a telegraphic signal transmission position in which telegraphic signals are transmitted by the first transmitter to the second receiver and in a data signal transmission position in which current start-stop data signals are transmitted by the first transmitter to the second receiver and retransmitted by the second transmitter to the first receiver comprising:

(i) in the transmitting station, means for selectively transmitting function signals including a first predetermined sequence of date signals for switching the receiver station from the telegraphic signal transmission position to the data signal transmission position, a first extended stop signal of adjustable duration, a second predetermined sequence of data signals and second error representative extended stop signals, means for detecting among the current start-stop signals the all space element combinations of the International Telegraphic Code, means for substituting for the said all space element combination immediately following a predetermined number of such combinations an all mark element combination, means for checking said current start-stop data signals and said function signals retransmitted by the receiver station with the corresponding transmitted current start-stop date signals and function signals, an alarm device, means for controlling said second error representative stop signals transmitting means, in response to said checking means when the same is checking the current start-stop data signals and means for operating said alarm device in response to said checking means when the same is checking the function signals;

(ii) in the transmitter and receiver stations multistage stores for storing therein a number of consecutive current data signals preceding the actually transmitted date signal, means for deriving from the duration of the first extended stop signal the number of stages of said multistage stores to be brought into operation and means for retransmitting the stored data signals in response to the second error representative extended stop signal, whereby a voluntary error is detected by the checking means when checking the returned all space element combination with the stored all mark element combination and preventing the successive transmission between the transmitter and receiver stations of more than said predetermined number of all space element combinations which would give rise to disconnection in said switching network.

References Cited

UNITED STATES PATENTS

| | | | |
|---|---|---|---|
| 2,242,196 | 5/1941 | Thompson et al. | 178—69 |
| 2,740,106 | 3/1956 | Phelps | 340—147 |
| 2,903,513 | 9/1959 | Phelps et al. | 178—17.5 |
| 3,228,000 | 1/1966 | Collis | 340—146.1 |

MALCOLM A. MORRISON, *Primary Examiner.*

C. E. ATKINSON, *Assistant Examiner.*